(12) United States Patent
Heylen

(10) Patent No.: US 6,535,469 B1
(45) Date of Patent: Mar. 18, 2003

(54) METHOD AND APPARATUS FOR DETERMINING THE PROVENANCE OF A DATA CARRYING DISC

(76) Inventor: Richard A A Heylen, 227 Otley Rd., Leeds (GB), LS16 5LQ (*) Notice: Subject to any disclaimer, the term of this patent is extended or adjusted under 35 U.S.C. 154(b) by 0 days.

(21) Appl. No.: 09/413,718
(22) Filed: Oct. 5, 1999

(30) Foreign Application Priority Data

Oct. 6, 1998 (GB) .............................................. 9821808

(51) Int. Cl.[7] .................................................. G11B 7/00
(52) U.S. Cl. .............................. 369/53.21; 369/53.15; 369/47.21
(58) Field of Search .......................... 369/47.1, 47.12, 369/47.13, 47.14, 53.1, 53.15, 53.17, 53.21, 59.1, 275.1

(56) References Cited

U.S. PATENT DOCUMENTS

| 5,418,852 A | 5/1995 | Itami et al. |
| 5,703,858 A | 12/1997 | Mitchell et al. |
| 5,812,501 A | * 9/1998 | Moribe et al. ............ 369/47.12 |

FOREIGN PATENT DOCUMENTS

| WO | WO9801852 | 1/1998 |
| WO | WO99/35641 | 7/1999 |

* cited by examiner

Primary Examiner—Muhammad Edun
(74) Attorney, Agent, or Firm—Frank Nguyen

(57) ABSTRACT

The manufacturing process for a data carrying disc, such as a CD, begins with the production of a master, and in the physical manufacturing process of the master, variations are introduced which give the master distinctive physical characteristics and cause errors in the data. The master is used to form generations of discs, and the physical characteristics of the master are passed on down the generations. A group of discs manufactured from the same source consistently exhibit the physical characteristics of the master, and those physical characteristics are used as a "fingerprint" for identifying that source. To determine the provenance of a data carrying disc, uncorrected data is read from the disc. Information about errors is extracted from the data read. The error information is then compared with characteristic error information which characterises data carrying discs produced from a well known source to determine whether the data carrying disc has been produced from the known source. The error information extracted is representative of errors arising from the physical manufacturing process.

23 Claims, 4 Drawing Sheets

FORMAT OF SUBCODING BLOCK

| | DATA BIT LOCATIONS | | d1 | d2 | d3 | d4 | d5 | d6 | d7 | d8 |
|---|---|---|---|---|---|---|---|---|---|---|
| | SUBCODE CHANNELS | | P | Q | R | S | T | U | V | W |
| | | 0 | LOCATION S0 EFM OCCURED | | | | | | | |
| | | 1 | LOCATION S1 EFM OCCURED | | | | | | | |
| SUBCODING SYMBOLS | FIRST LOCATION TO HOLD DATA | 2 | | | | | | | | |
| | | . | | | | | | | | |
| | | . | | | | | | | | |
| | | 96 | | | | | | | | |
| | | 97 | | | | | | | | |

METHOD AND APPARATUS FOR DETERMINING THE PROVENANCE OF A DATA CARRYING DISC

BACKGROUND TO THE INVENTION

The present invention relates to methods and apparatus for determining the provenance of data carrying discs, such as compact discs (CD), and digital versatile discs (DVD).

The traditional CD is a read only storage medium. Originally, CDs were used for the storage of music and other audio data. However, formats, such as the CD-ROM format, have been developed facilitating the reliable storage of data for use by computers and other digital devices. The CD-ROM format has become very popular and has become the mass data storage medium for computer programs and other files.

CDs can store about 74 minutes of high quality stereo sound or about 650 megabytes of data or some combination of both. The value of a CD to the end user, because of the value of the data it stores, is typically much more than its physical cost. This has made it an attractive target for counterfeiters who can produce replicas of an original CD at a nominal cost and sell the replicas, at the market price for the data, to make large profits.

With distribution media such as audio tapes or video cassettes, the quality of counterfeit copies tends to be lower than that of the originals due to the corruption of the analogue signal in the copying process. There is no such degradation in the case of discs such as CDs, however, as all of the information is stored digitally. Counterfeiters can therefore produce counterfeit copies of CDs which are almost indistinguishable from original or bona fide CDs.

If it were possible to distinguish between an original or bona fide CD and a counterfeit, then the problems caused by counterfeiters could be substantially reduced. Law enforcement officials, for example, would have a means of identifying counterfeit CDs, and could more easily obtain search warrants and secure prosecutions. If a CD carries a program, that program could be used to check that it was loaded from a bona fide, original CD.

SUMMARY OF THE INVENTION

The present invention seeks to identify counterfeit CDs and other data carrying discs.

According to a first aspect of the present invention there is provided a method of determining the provenance of a data carrying disc, the method comprising the steps of reading uncorrected data from the disc and extracting information about errors from the data read, and comparing the error information with characteristic error information which characterises data carrying discs produced from a known source to determine whether the data carrying disc has been produced from the known source.

The manufacturing process for a data carrying disc, such as a CD, begins with the production of a master, and in the physical manufacturing process of the master, variations are introduced which give the master distinctive physical characteristics and cause errors in the data. The master is used to form generations of discs, and the physical characteristics of the master are passed on, down the generations. A group of discs manufactured from the same source, therefore, consistently exhibit the physical characteristics of the master, and those physical characteristics can be used as a "fingerprint" for, or identification of, that source. This invention has relevance to all data carrying discs, such as CDs and DVDs (digital versatile discs) and other optical discs, where errors in the data, which arise out of the physical manufacturing process, are consistently reproduced in all discs originating from the same source.

Thus, in a method of the invention, the error information extracted is representative of errors arising from the physical manufacturing process and acts as a fingerprint for a particular known source in the manufacturing process.

An embodiment of a method of the invention may be used to identify that a data carrying disc is genuine when the error information extracted from the disc correlates with the characteristic error information from a known and genuine source. Similarly, the absence of correlation between the error information and the characteristic error information may be used to identify a counterfeit disc.

CDs carrying popular music or computer programs, for example, may originate from a number of masters from manufacturing plants in different countries. What is more, the or each master will not be used to directly form the CDs. Each master is used in the production of a number of stampers which are used to produce the discs sold in the marketplace. It will, therefore, be appreciated that although the fingerprint of one master will be apparent in its progeny, each stage of the process will also introduce fingerprints from the sources used in those stages. It is therefore possible that if error information extracted in an embodiment of a method of the invention is compared only with characteristic error information from one genuine source there will no correlation. For example, if the characteristic error information arises from one master, but genuine CDs can have been manufactured from one of a number of masters, there may be no correlation and yet this will not necessarily mean that the disc under test is counterfeit. Accordingly, unless the characteristic error information to be used in the comparison is known to be characteristic of the single and only master, it will generally be necessary to store characteristic error information from a number of masters or other sources.

The characteristic error information with which the error information is compared may be representative of errors which have arisen during the manufacture of the known sources. Additionally, and/or alternatively, the sources from which discs are produced may be impressed with characteristic error information to provide copy protect signals to signify that a disc is from a genuine source.

The characteristic error information, with which the extracted error information is compared, may be read from a disc whose provenance is known, for example, in real time as the error information is extracted. A correlation may then be made between the extracted error information and the characteristic error information from the known and genuine disc in order to determine the likelihood that the disc under test is a counterfeit.

In a preferred embodiment, characteristic error information is obtained from a group of discs from a common source, for example, which are all known to have been produced from a common and genuine master, or a common and genuine stamper. Error information common to each of the discs in the group is then extracted and stored to provide the characteristic error information with which the error information from a disc under test is compared.

Methods of the invention may be used, as described, to determine whether a disc is genuine or counterfeit. Alternatively, the method may be used to establish the degree of similarity between a disc under test and discs from a known source.

When data carrying discs such as CDs and DVDs are read, the digital data is processed to correct errors so that the normal output is error free.

The error correcting process is undertaken in various stages. Thus, where the disc is read by a laser, a bit stream is formed which is then, for example, divided into blocks, which blocks are translated into bytes and then into frames, the frames being subjected to error correction and then being assembled into sectors and encoded. The encoded data is then divided into sub-channels.

In a method of the invention, the uncorrected information read from the data carrying disc may be taken from any of the stages or levels of data which are produced. The method requires that the data which is read reveals errors which have arisen from the physical manufacturing process. Thus, the data which is read has not generally undergone significant error correction.

Alternatively, the normal reading process may be modified to extract uncorrected information from the data carrying disc.

Clearly, appropriate processing means may be used to enable data at any stage or level to be read and error information to be extracted.

In a reader for a CD or DVD, for example, there are drive means to position the laser relative to sectors on the disc and the positioning data used by such drive means is not error free. Furthermore, readers already incorporate means to read this positioning data. In a preferred embodiment of a method of the invention, it is proposed to extract the error information from positioning data read from the data carrying disc.

Where the disc is a CD, it is preferred that a method of the invention reads the Q-subchannel blocks of data in order to enable the extraction of the error information.

In an embodiment of a method of the invention particularly relevant to present day CDs and their readers, the method further comprises the steps of reading the Q-subchannel blocks of a CD and determining which Q-subchannel blocks have been corrupted or are missing, and comparing the list of corrupted or missing blocks with a characteristic list of corrupted or missing blocks.

The characteristic list of corrupted or missing blocks may have been produced by reading a group of CDs from a common source, determining for each disc a list of corrupted or missing blocks, and then forming a characteristic list of corrupted or missing blocks common to all of the CDs of said group.

In an embodiment, a number of characteristic lists obtained from groups of genuine CDs are stored and the error information extracted from a disc under test is compared with all of the characteristic lists whereby it is determined if the CD is genuine.

The present invention also extends to apparatus for enabling the provenance of a data carrying disc to be determined, said apparatus comprising a disc reader for reading uncorrected data from a data carrying disc, and processing means for extracting information about errors from the data read, and for comparing the error information with characteristic error information which characterises data carrying discs produced from a known source to determine whether the read data carrying disc has been produced from the known source.

In an embodiment, said apparatus comprises means for identifying that a data carrying disc is genuine when the error information extracted from the disc correlates with the characteristic error information from a known and genuine source.

In an embodiment, said apparatus comprises means for storing characteristic error information from a number of known sources.

Additionally and/or alternatively, said apparatus may comprise means for storing characteristic error information which has been impressed on known sources.

The processing means may be arranged to compare the extracted error information with characteristic error information read from a disc whose provenance is known as the error information is extracted.

According to a further aspect of the present invention there is provided apparatus for enabling the provenance of a data carrying disc to be determined, said apparatus comprising a disc reader for reading blocks of data from a data carrying disc, processing means for identifying and listing blocks of the data which have been corrupted or are missing, storage means for storing a characteristic list of corrupted or missing data blocks which characterises discs produced from a known source, and means for comparing the identified list with the characteristic list to determine if said disc has been produced from said known source.

Preferably, the disc reader is arranged to read blocks of positioning data such that blocks of positioning data which have been corrupted or are missing can be listed and compared with a characteristic list of corrupted or missing positioning data blocks.

In an embodiment, where the disc is a CD, said disc reader is preferably arranged to read the Q-subchannel blocks in order to extract the error information.

In an embodiment, the processing means is arranged to determine which Q-subchannel blocks have been corrupted or are missing, and to compare the list of corrupted or missing blocks with said characteristic list of corrupted or missing blocks.

The characteristic list of corrupted or missing blocks may have been produced by reading a group of CDs from a common source, determining for each disc a list of corrupted or missing blocks, and then forming a characteristic list of corrupted or missing blocks common to all of the CDs of said group.

In an embodiment, said apparatus has storage means for storing a number of characteristic lists obtained from groups of genuine discs, and said processing means is arranged to compare the identified list with all of the characteristic lists whereby it is determined if a disc under test is genuine.

The methods and apparatus defined above enable genuine and counterfeit discs to be distinguished where, for example, all genuine discs come from a common source such that they all carry the unique fingerprint of that common source. However, where there is more than one genuine source for a group of discs, unless the tester has access to characteristic error information, or fingerprints, from all genuine sources, the determination of the provenance of a test disc can be left in some doubt. Thus, the result of a test might be that this disc is likely to be counterfeit because it does not correlate with the finger print information stored.

Thus, it may be preferred to impress a characteristic fingerprint or unique identifying error information on to all genuine discs when they are made.

According to a still further aspect of the present invention there is provided a method of incorporating identifying error information into a data carrying disc, where the data carrying disc is physically manufactured either directly or indirectly from a master, and wherein the master is produced by a manufacturing process which is controlled by processing means, the method comprising the step of providing identifying error data to said processing means such that said identifying error information is incorporated in the master during its formation.

Thus, all manufacturing plants for proprietary audio material or software could be provided with unique identifying error information for that material which identifying error information is impressed into the master, and hence into any copies made therefrom, during manufacture. Methods and apparatus of the invention for determining the provenance of the discs can thereby reliably identify all genuine discs, and hence all counterfeits.

Methods and apparatus of the invention can be used not only to identify genuine or counterfeit discs, but also to deny access to the data on counterfeit discs.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

As is made clear above, the present invention can be used for any data carrying discs where errors in the data on the discs arising out of the physical manufacturing process will be consistent for all discs originating from the same source. In particular, the invention can be used for CDs and DVDs.

As is well known, a CD or a DVD originates from a glass master which is cut by a laser whilst the disc is rotated on a mandrel. The laser beam intensity is modulated by the data to be recorded. Each master is used to make nickel copies which are used to make stampers. Commercial CDs and DVDs are manufactured using these stampers. Every master is physically unique, and will have errors resulting from imperfections in the glass substrate or photoresist coating, and arising out of variations, for example, in the speed of rotation of the mandrel and from the movement of the laser. These errors produce a fingerprint which is inherent to the master. Similarly, as the generations of copies to produce the stamper and then the CD/DVD discs are made directly and then indirectly from the master, additional unique fingerprints will be superimposed on each generation copy. These fingerprints, which are physical characteristics which may corrupt or cause errors in the data, are passed on to successive generations of copies. Of course, each generation, because of the manufacturing process used to produce it, has its own set of errors or its own fingerprint. Thus, every CD and DVD has superimposed fingerprints, one of which can be attributed to each of its ancestors.

With methods and apparatus of the invention, a group of discs from a common source, for example all formed by the same stamper, are analysed and errors common to all of the discs in the group are identified. These common errors are thus representative of the fingerprint of the stamper and can be compared with the errors in a disc under test to determine whether or not that test disc belongs to the same group.

With this invention, errors in the data are accessed to determine the fingerprint of a disc. It will be appreciated that the data format of a CD differs from that of a DVD. For simplicity, the present invention is described herein with specific reference to CDs. However, the invention is applicable to DVDs, although the level at which the errors are detected in the DVD data format will differ, and a modified DVD reader may be required in order to access the errors.

Accordingly, to further explain a specific embodiment of the present invention, the data format of a CD will now be briefly described.

Figures 1, 3:
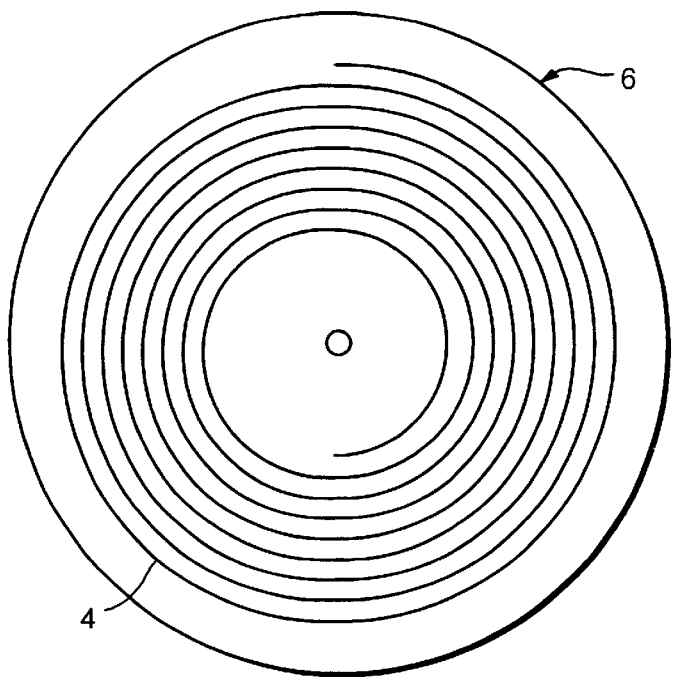
FIG. 1 shows schematically a data carrying disc with a spiral track.
FIG. 3 illustrates the format of a subcode block of data read from a CD.

Data is recorded on CDs according to the International Standard ISO/IEC 10149. The data is present on the CD as a sequence of pits of varying length in the reflective material of a CD. As is indicated in FIG. 1, these pits lie on a tight spiral 4 which runs continuously from near the centre of the reflective portion to near the outside of the reflective portion of a CD 6. A CD reader uses a laser to scan along the spiral and it detects the edges of the pits by measuring the reflectivity of the disc as it scans. The presence of a pit causes less of the light to be reflected back.

The laser produces a beam of light which is reflected from the disc 6 for its intensity to be measured with a photodetector. The photodetector produces an analogue signal which can be identified with the reflectivity of the disc along the spiral. The signal is amplified and converted to produce a stream of zero bits with a set bit for every edge detected. This is called the EFM (eight to fourteen modulation) stream and is the first digital signal from the disc.

Figure 2:
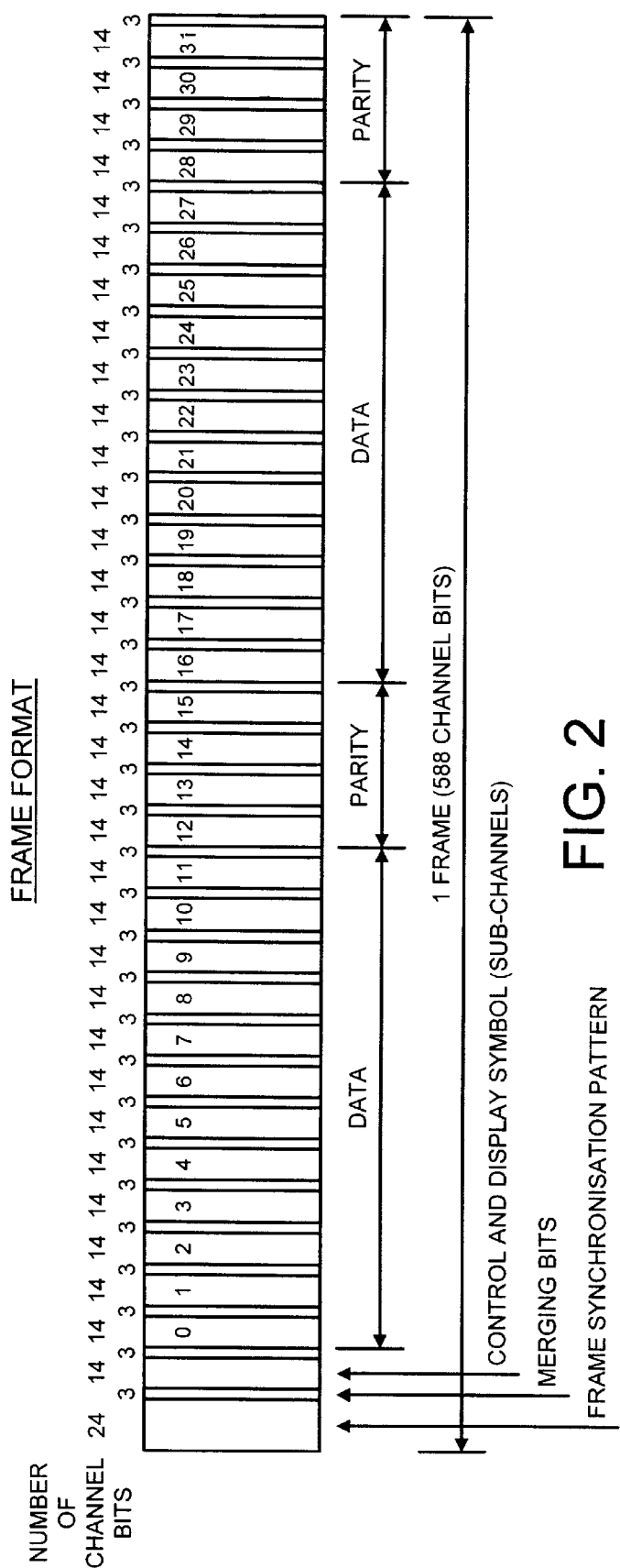
FIG. 2 shows a frame format of data read from a CD.

The EFM stream is divided into blocks separated by a 24 bit synchronisation pattern. The synchronisation pattern is followed by three "merging" bits and then 33 lots of 14 bit words each followed by three "merging" bits. The 14 bit words are passed through a EFM demodulator (for example, a look-up table) which translates the words into 8 bit bytes. Each EFM block separated by the 24 bit synchronisation pattern therefore translates into a "frame" of 33 bytes as illustrated in FIG. 2. One byte of every frame is used for the "subcode" and the remaining 32 bytes are passed to C1 and C2 decoders which apply error correction.

Error corrected data comes out of the decoders in 24 byte blocks. These blocks are assembled sequentially, 98 at a time, into 2352 byte sectors. These 2352 bytes encode audio data but computer data has another layer of error correction on top, leaving 2048 bytes of user data. The subcode bytes are assembled vertically 98 at a time into subcode blocks as is shown in FIG. 3. The first two subcode bytes are synchronisation bytes and the rest of the bytes are divided into the P, Q, R, S, T, U, V and W subchannels. The P-subchannel consists of the high order bit of the 96 non-synchronisation subcode bytes. The Q-subchannel block is made from the second highest order bit of the same bytes and so on.

Figure 4:
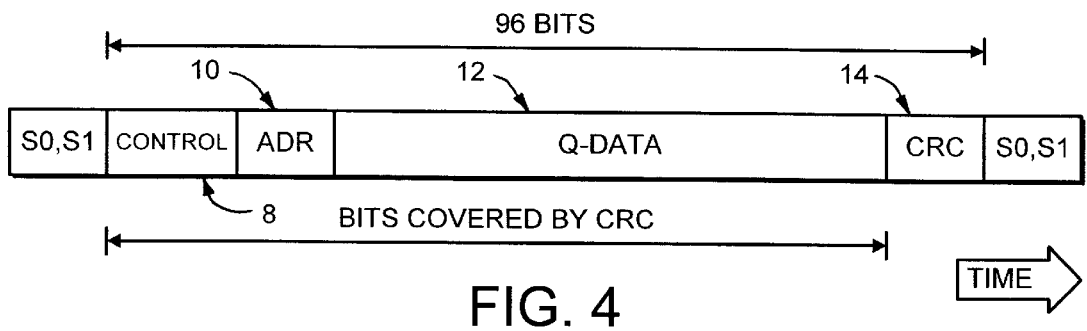
FIG. 4 illustrates the general data format of the Q-subchannel.

FIG. 4 shows the general data format of the Q-subchannel block. As shown, the first four bytes of the Q-subchannel block are the "control" field 8, the second four make up the "ADR" field 10. 72 DATA-Q bits, 12, then follow, the interpretation of which depends on the value of the ADR field. There then follows a 16 bit CRC 14 on the three previous fields. The CRC detects errors but does not correct them.

There are very nearly the same number of Q-subchannel blocks as there are sectors on a CD. It may appear from the description that Q-subchannel blocks correspond to sectors on a one to one basis; but this is not quite true as the C1 and C2 decoders delay some bytes for the purposes of coping with burst errors.

Q-subchannel blocks do not enjoy the same level of error correction as the data in the sectors. This means that quite a few subchannel blocks on the disc do not have valid CRCs and are hence corrupted due to natural errors introduced during mastering and general wear and tear.

Normally the Q-subchannel blocks are used by the drive of a CD reader to navigate around the CD. When the "ADR" field contains "0001" the DATA-Q bits encode the position of the block in the track from the start of the disc. Each Q-subchannel block therefore has a unique address which increases monotonically.

The Q-subchannel block can be used to record other information such as the UPC/EAN which is effectively a bar code or an ISRC as defined in DIN-31-621. These Q-subchannel blocks do not contain much position data and hence are not so useful for navigating around the drive. They are placed at regular but fairly large intervals in the Q-subchannel so as not to interfere with the CD drive's navigation requirements.

It is not possible to detect errors on a CD by reading the sector data as extensive error correction procedures ensure that the sector data is always correct. However, there is no error correction applied to the Q-subchannel. What is more, as the Q-subchannel is used to provide positioning information it can be read by a conventional CD reader. This means that specialised hardware is not needed to read the error information from the disc and conventional processing means can then use the data read to extract the error information.

With the method of the invention, the laser pick up is moved to a certain position on a CD. In response to a Read Q-subchannel command, the Q-subchannel block that most recently passed under the laser pick up is read. This process is repeated sequentially until all of the Q-subchannel blocks on a CD have been read.

As the whole disc is read sequentially, any missing Q-subchannel blocks can be identified and listed. These are Q-subchannel blocks which include corrupted data. They can be detected by comparing the CRC recorded at the end of the block with a CRC computed by the drive. If the CRCs are not the same, the Q-subchannel block is listed as corrupted and hence missing.

Figure 5:
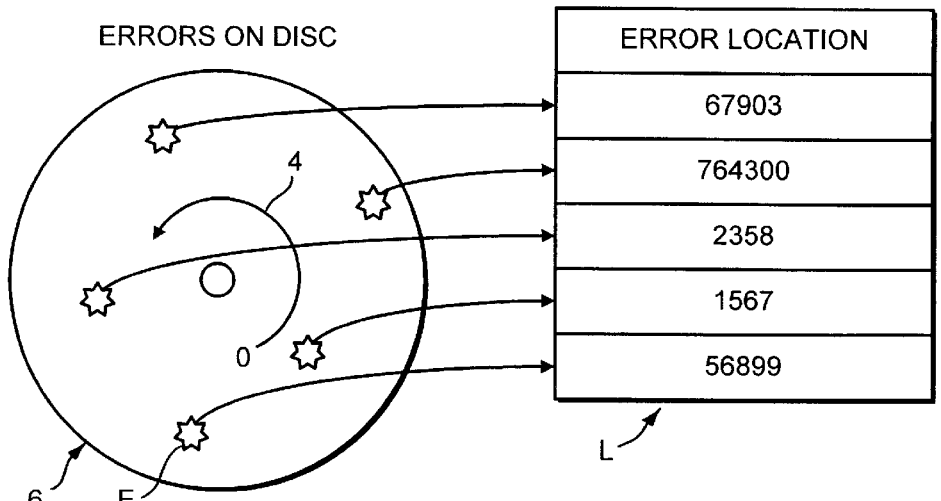
FIG. 5 illustrates the formation of a list of the locations of data errors.

As is explained above, a list of missing blocks will be unique to each disc, although a set of discs from the same stamper, for example, will have errors in common. FIG. 5 shows schematically a CD 6 which has a number of errors E which are corrupted Q-subchannel blocks. The location of the errors E are listed, as described below, to form an error list L.

Figure 6:
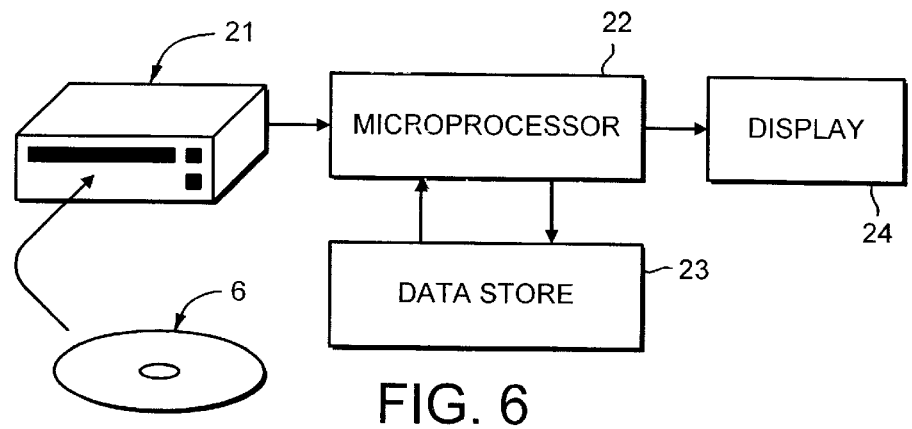
FIG. 6 shows a block diagram of apparatus of an embodiment of the invention for determining the provenance of a CD.

FIG. 6 shows an embodiment of an apparatus for determining the provenance of a CD. This apparatus comprises a CD reader 21 connected to processing means 22. The processing means 22 communicates with a data store 23 and also has a display 24 which may be used to visually indicate information about the provenance determining process.

As explained above, a disc 6 to be tested is inserted into the CD reader 21 and, under the control of the microprocessor 22, the CD is sequentially read. The CRC of each Q-subchannel block is checked against the contents of the block and the microprocessor 22 then stores or displays a list L of the Q-subchannel blocks which do not have a valid CRC. The list of corrupted or missing blocks could be used alone to determine the provenance of the CD. Additionally, and if required, the Q-subchannel blocks which contain UPC/EANs or ISRCs are detected and written to storage or displayed by the microprocessor 22.

The microprocessor 22 may also, if required, calculate a check sum of the data on the CD and store or display the value computed.

It is additionally or alternatively possible to monitor error flags from the C1 and C2 decoders. This enables a list to be extracted of sectors, and positions within the sectors, where errors have been detected by the decoders. The C1 and C2 decoders, as well as detecting errors, can correct them and this fact, together with information as to which decoder detected the error and which decoder corrected the error, if indeed it was corrected, can also be extracted. By all of these means, the microprocessor 22 extracts error information from the CD to be used in determining its provenance. This error information is then compared with characteristic error information.

To obtain the characteristic error information for the comparison, discs from the same batch are read using apparatus as shown in FIG. 6 to extract the same error information as has been described. In this respect, the group of discs which have been read will all have been produced from the same master or stamper on the assumption that all the discs in that group will have errors caused by the fingerprint of that master or stamper. The data from all of the discs in the group is compared to identify error information that is common to every disc. The characteristic list of error information can then be formed and stored or displayed by the microprocessor 22. Then, the error information extracted from the disc on test may be compared with the characteristic list and it is possible to determine, by that comparison, if the disc comes from the same group as the discs used to make the characteristic list.

It would be possible simply to check that the disc under test has all of the errors of the characteristic list. Preferably, however, the data from the test disc and the characteristic error data are correlated to calculate their degree of similarity. This may be done by cross referencing the two sets of data, identifying common features, and then making a calculation using statistical methods of the probability of the common features occurring purely by chance. A calculation of the probability that the discs are from different manufacturings can be made. A certain probability is taken as the threshold above which the hypothesis will be accepted.

The statistical method used can be chosen as required. Currently Bayesian statistical methods are preferred.

When a characteristic list of error features has been obtained from a group of discs and stored it is then possible to test a number of discs sequentially against that stored list. The process can be speeded up by using the stored list to identify the portions of the disc under test at which errors would be expected, and then reading only those portions of the test disc rather than reading the whole of the test disc sequentially.

It is possible to generate a glass master with known missing Q-subchannel blocks by intentionally corrupting the CRC of certain Q-subchannel blocks in known positions. By this method, the positions of the intentional missing Q-subchannel blocks will be known before the glass master is made and the data recorded on it. If a glass master is produced using this process, it is then possible to check that a disc is legitimate by seeking to identify on a disc the known missing Q-subchannel blocks. If any of the blocks that are supposed to be missing are, in fact, present, a determination can be made that the CD is counterfeit and this information could be used, if required, to stop the running of the disc. Conversely, if the blocks which are supposed to be missing are missing, the disc is determined to be genuine and can be used normally.

Figure 7:
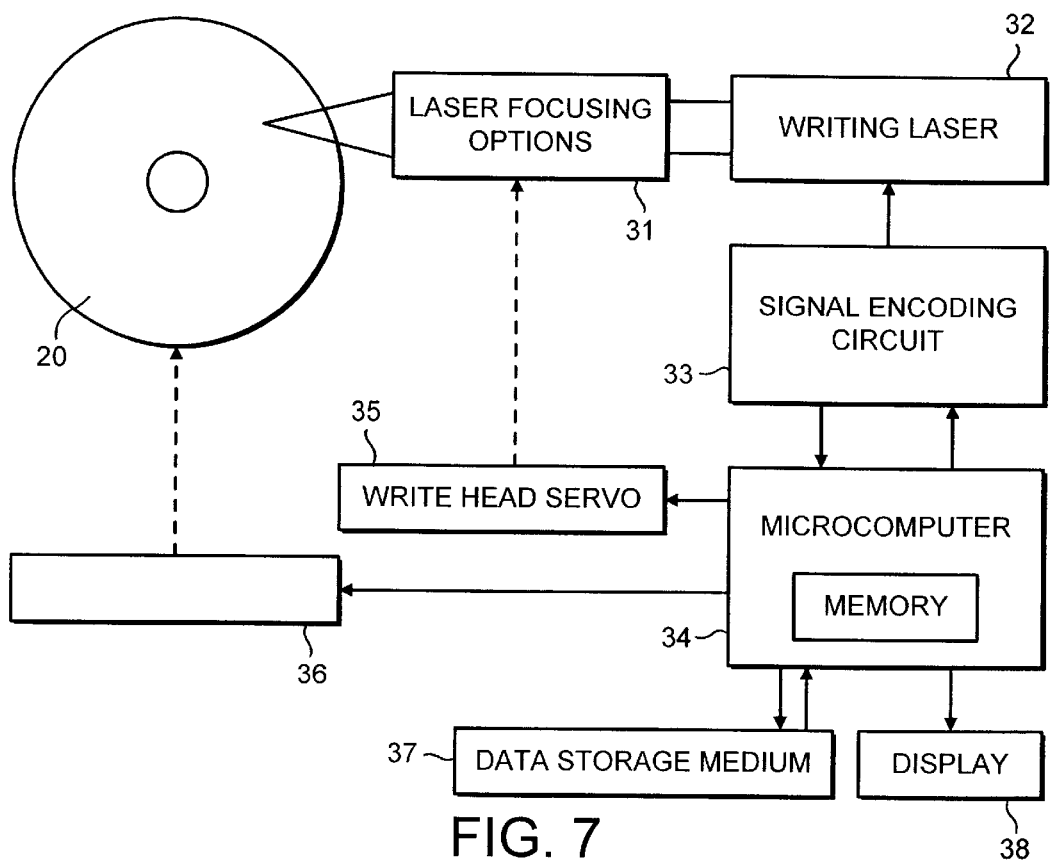
FIG. 7 shows a diagram of apparatus for incorporating identifying error information into a CD.

FIG. 7 shows an apparatus for recording a master with known identifying error information such as, for example, a known characteristic list of missing Q-subchannel blocks. The apparatus shown in FIG. 7 is very similar to conventional apparatus for manufacturing a master. The apparatus has processing means 34, with memory, to control the system. In particular the processor 34 controls a laser 32 to write on a disc 20. A data storage medium 37, which will contain the data to be encoded on the disc 20, is coupled to the microprocessor 34, and the data is passed thereby to signal encoding circuitry 33 where the data is then coded on to a laser intensity modulation signal. This signal is passed to the laser 32 which produces laser light with the required modulation. The light is passed through laser focusing optics 31 which focuses the laser light onto the correct portions of the disc 20.

The processing means 34 controls the positioning of the focusing optics 31 by way of a write head servo 35. The processing means 34 also controls the rotational speed of the disc 20 by way of a spindle controller 36 which controls the speed of rotation of a mandrel on which the disc 20 is mounted.

To add identifying error information to the master, and to all of the generations of copies produced therefrom, it is necessary only to provide in the data storage medium 37 the identifying error data required. The identifying error data causes the stream of user data encoded onto the laser intensity modulation signal to be altered so as to introduce the features identified in the identifying error data. Where the disc is a glass master, all stampers and discs physically made from it will have the same identifying error data. If such a CD is then subjected to the method of the invention to identify its provenance it will produce error information which strongly correlates with the identifying error data supplied to the master in its manufacture.

Where the identifying error data added to the master is, as described above, an intentional corrupting of Q-subchannel blocks, a group of legitimate discs can be used to produce a list of the common missing Q-subchannel blocks for the group. Then, it is necessary only to test each test disc to see if it has Q-subchannel block in portions thereof where legitimate discs have missing Q-subchannel blocks. Identification of a block where it is supposed to be missing shows that the CD is counterfeit.

It will be appreciated that variations in and modifications of the present invention may be made within the scope of this application.

What is claimed is:

1. A method of determining the provenance of a first data carrying disc, where the data on said first disc has errors which have inherently arisen as a result of the physical manufacturing process, and wherein data is normally read from said disc by a normal reading process arranged to correct said errors, the method comprising the steps of:

reading data from said first data carrying disc in an uncorrected form, and extracting from the uncorrected form of the data information about errors in the data on said disc;

providing characteristic error information and comparing the extracted error information with the characteristic error information;

wherein said characteristic error information is a characteristic of all data carrying discs which have been produced from a known source whereby said comparison step is enabled to determine whether said first disc has also been produced from said known source.

2. A method according to claim 1, wherein said first data carrying disc is identified as genuine when the extracted error information from the disc correlates with the characteristic error information from a known and genuine source.

3. A method according to claim 1, wherein said first data carrying disc is identified as counterfeit in the absence of correlation between the extracted error information and the characteristic error information.

4. A method according to claim 1, further comprising the step of reading the characteristic error information, with which the extracted error information is compared, from a known and genuine disc, and then making a correlation between the extracted error information and the characteristic error information from the known and genuine disc in order to determine the likelihood that the disc under test is a counterfeit.

5. A method according to claim 4, wherein the characteristic error information is read from the known and genuine disc in real time.

6. A method according to claim 1, further comprising the steps of obtaining characteristic error information from a plurality of discs, where each of the discs of said plurality has been produced from the same known source, and extracting and storing error information common to each of the discs in the plurality to provide the characteristic error information with which the error information from said first disc under test is compared.

7. A method according to claim 1, wherein said normal reading process, which is arranged normally to read data from the disc and to correct errors, incorporates various reading, processing, correcting and encoding stages or levels, and wherein the method further comprises the steps of reading uncorrected information from the data carrying disc by taking data from any of the stages or levels of data which are produced during the normal reading process.

8. A method according to claim 7, wherein, where the disc is a CD, and said normal reading process reads and processes Q-subchannel blocks of data from said CD, the method further comprising the step of reading the Q-subchannel blocks of data in order to enable the extraction of the error information.

9. A method according to claim 8, further comprising the steps of reading the Q-subchannel blocks of the CD and determining which Q-subchannel blocks have been corrupted or are missing to form a list of corrupted or missing blocks, and comparing the list of corrupted or missing blocks with a characteristic list of corrupted or missing blocks.

10. A method according to claim 1, wherein said normal reading process, which is arranged normally to read data from the disc and to correct errors, is modified to extract uncorrected information from the data carrying disc.

11. A method according to claim 10, further comprising the step of extracting error information from the data carrying disc from positioning data read from the disc by said normal reading process.

12. A method according to claim 1, wherein said characteristic error information has been obtained by reading data from at least a second data carrying disc which has been produced from said known source.

13. Apparatus for enabling the provenance of a first data carrying disc to be determined, where the data on said first disc has errors which have inherently arisen as a result of the physical manufacturing process, and wherein data is normally read from the disc by a normal reading process arranged to correct said errors, said apparatus comprising:

a disc reader arranged to read data from said first disc in an uncorrected form, and processing means for extracting information about errors from the uncorrected form of the data read from the disc, said processing means having characteristic error information and being arranged to compare the extracted error information with the characteristic error information, wherein said characteristic error information characterizes data carrying discs which have been produced from a known source, and wherein said processing means compares the extracted error information with the characteristic error information to determine whether said first data carrying disc has also been produced from the known source.

14. Apparatus according to claim 13, further comprising means for identifying that the data carrying disc is genuine when the extracted error information from the disc correlates with the characteristic error information from a known and genuine source.

15. Apparatus according to claim 13, further comprising means for storing characteristic error information from a number of known sources.

16. Apparatus according to claim 13, further comprising means for storing characteristic error information which has been impressed on known sources.

17. Apparatus according to claim 13, further comprising extraction means arranged to read characteristic error information from a disc whose provenance is known, and wherein said processing means is arranged to compare said extracted error information read from the first disc with the characteristic error information as it is provided by said extraction means.

18. Apparatus for enabling the provenance of a data carrying disc to be determined, where the data on said disc has errors which have inherently arisen as a result of the physical manufacturing process, and wherein data is normally read from the disc by a normal reading process arranged to correct said errors, said apparatus comprising a disc reader arranged to read blocks of data from the data carrying disc in uncorrected form, processing means for identifying and listing blocks of the data which have been corrupted or are missing, storage means for storing a characteristic list of corrupted or missing data blocks which characterizes discs produced from a known source, and means for comparing the identified list with the stored characteristic list to determine if said disc has been produced from said known source.

19. Apparatus according to claim 18, wherein the disc reader is arranged to read blocks of positioning data such that blocks of positioning data which have been corrupted or are missing can be listed and compared with a characteristic list of corrupted or missing positioning data blocks.

20. Apparatus according to claim 19, where the disc is a CD, and wherein said disc reader is arranged to read the Q-subchannel blocks in order to extract the error information.

21. Apparatus according to claim 18, wherein said apparatus has storage means for storing a number of characteristic lists obtained from groups of genuine discs, and said processing means is arranged to compare the identified list with all of the characteristic lists whereby it is determined if a disc under test is genuine.

22. A method of incorporating identifying error information into a data carrying disc, where the data carrying disc is physically manufactured either directly or indirectly from a master, and wherein the master is produced by a manufacturing process which is controlled by processing means, the method comprising the steps of providing identifying error data to said processing means, and incorporating the identifying error data into the data to be impressed onto the master during its formation to provide identifying error information on discs produced from the master, and wherein the identifying error data is representative of errors which arise during the physical manufacturing process of a data carrying disc and can be read and identified by a normal reading process.

23. A method according to claim 22, further comprising obtaining error information from each one of a plurality of data carrying discs where each of the discs of said plurality has been produced from the same known source, and where the errors in each of the discs have arisen inherently out of the physical manufacturing process, extracting error information which is common to each of the discs in the plurality, and storing the extracted error information as characteristic error information which characterizes data carrying discs which have been produced from said known source, the method further comprising the step of utilising the characteristic error information as the identifying error data.

* * * * *